Dec. 11, 1945. T. E. GOHLKE 2,390,582
BELT DRIVE REVERSING UNIT
Filed April 10, 1944 2 Sheets-Sheet 1

INVENTOR.
THEODORE E. GOHLKE
BY
ATTORNEYS

Dec. 11, 1945.  T. E. GOHLKE  2,390,582
BELT DRIVE REVERSING UNIT
Filed April 10, 1944  2 Sheets-Sheet 2

INVENTOR.
THEODORE E. GOHLKE
BY
ATTORNEYS

Patented Dec. 11, 1945

2,390,582

UNITED STATES PATENT OFFICE 2,390,582

BELT DRIVE REVERSING UNIT

Theodore E. Gohlke, Detroit, Mich., assignor of one-half to Helen Gohlke, Detroit, Mich.

Application April 10, 1944, Serial No. 530,363

3 Claims. (Cl. 74—296)

The invention relates to reversible transmission mechanisms and has for its object the obtaining of a compact unit construction which will transmit motion in forward and reverse directions.

It is a further object to obtain a construction in which all of the mechanism is enclosed and is controlled in its operation by a lever mounted at one end of the structure.

It is a further object to obtain various advantageous features as hereinafter set forth.

Figure 1:
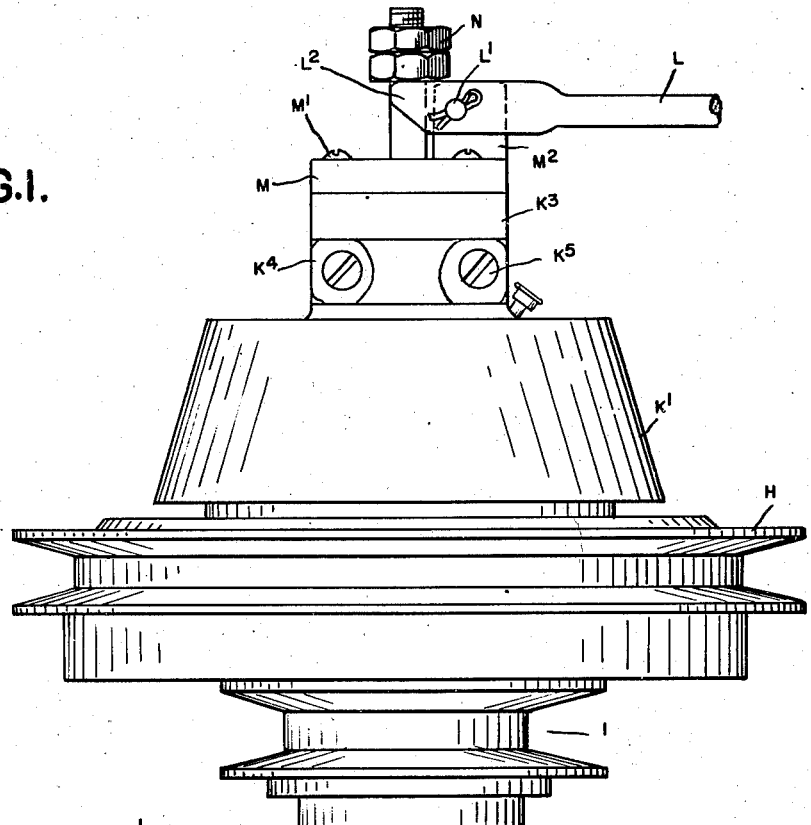
Fig. 1 is a side elevation of the unit.
Figure 4:
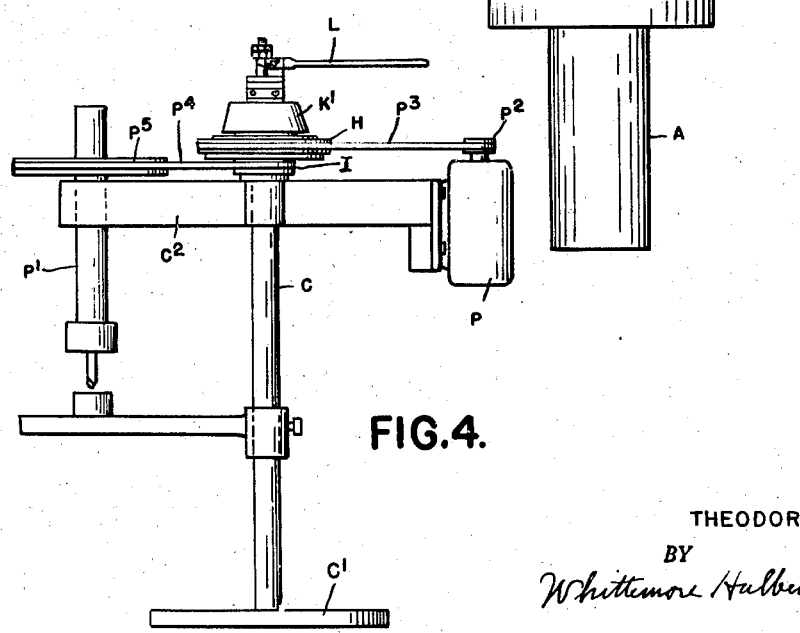
Fig. 4 is a diagram showing the unit as mounted on a drill press.
Figure 2:
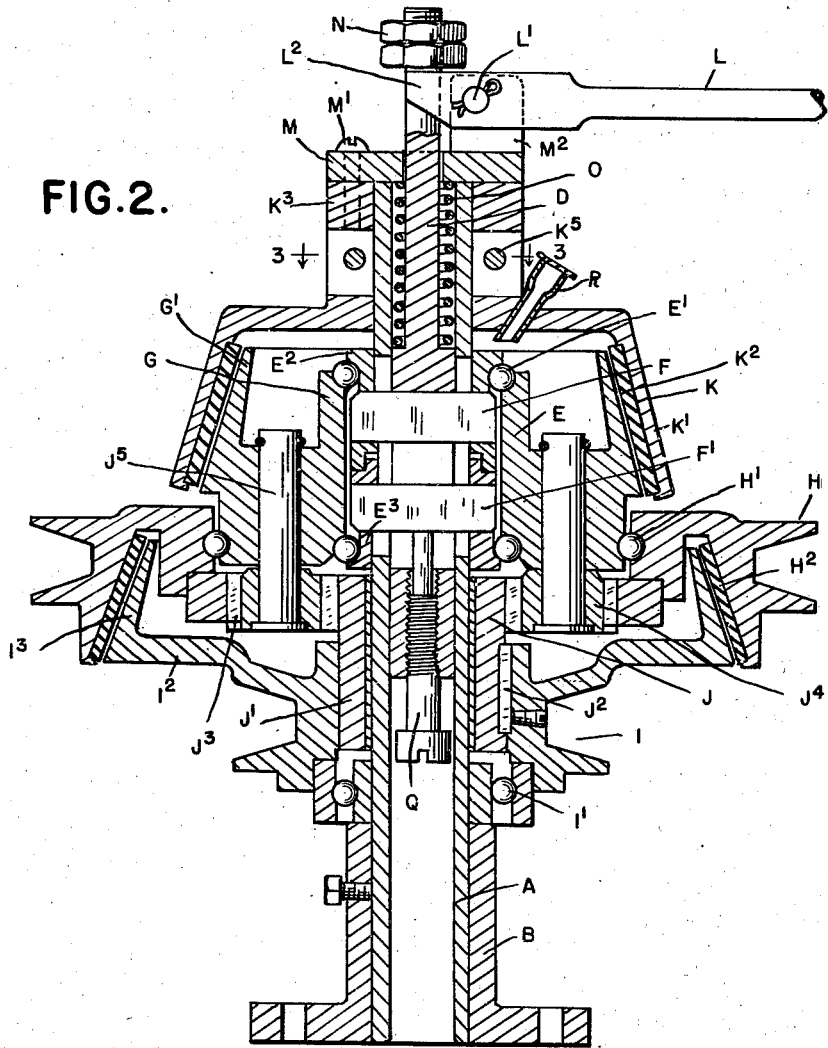
Fig. 2 is a vertical central section therethrough.
Figure 3:
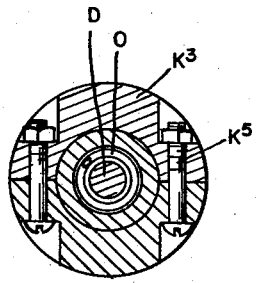
Fig. 3 is a cross section on line 3—3, Fig. 2.

A is a hollow post constituting a mounting for the unit and which may be engaged with any suitable support such as the socket B (Fig. 2), or with the upper end of a column C of a drill press (Fig. 4). Within the post A is an axially movable rod D which is connected to an external sleeve or bearing E by means of cross bars F, F' passing through diametrically opposite slots in the post. Revolubly on the sleeve or bearing E, preferably on ball bearings E', is a member G which has on one portion thereof a clutch member G' preferably of conical form. On another portion of the member G is revolubly mounted, preferably on ball bearings H', an independently revoluble pulley H. The inner face of this pulley is conical and constitutes a clutch member having a lining $H^2$ secured thereto. I is another pulley member of smaller diameter which is mounted on the post A preferably by ball bearing I'. Integral with this pulley I is a head $I^2$ having a conical flange $I^3$ forming the cooperating clutch member for the clutch member $H^2$. The bearing I' is adapted to take both radial and axial thrust so that the pulley I' and clutch member $I^3$ are freely revoluble but held from axial movement. The pulley H and head $I^2$ together form an enclosure for a planetary transmission mechanism. This includes a sun gear J having a hub portion J' extending within the hub of the pulley I and non-rotatively connected therewith by a key $J^2$; also, an internal gear $J^3$ connected to the pulley H and intermediate planetary gears or pinions $J^4$ which are mounted on pins $J^5$ engaging bores in the member G. The arrangement is such that when the clutch member $H^2$ is engaged with the clutch member $I^3$, the member G, transmission mechanism and pulley I will revolve as a unit. On the other hand, when the clutch members $H^2$, $I^3$ are disengaged and assuming that the member G is held against rotation, motion from the pulley H will be transmitted through the gear wheel $J^3$, pinions $J^4$ and sun gear J to the pulley I driving the latter in reverse direction and at a higher rotary speed.

For cooperation with the clutch member G' there is an inverted cup-shaped member K having a conical flange K' and brake lining $K^2$. The member K is fixedly secured to the post A preferably by means of a hub portion $K^3$ cut away at one side thereof for a clamping cap portion $K^4$ secured by bolts $K^5$. The member K is so positioned in relation to the pulley I and clutch flange $I^3$ that the member G when moved axially in one direction will be braked by the member K and, when moved in the opposite direction, will carry the clutch member of the pulley H into engagement with the cooperating member $I^3$. This axial movement of the member G is effected by a corresponding movement of the rod D within the hollow post which, in turn, is actuated by a lever L mounted at the upper end of said post. As shown, a cap member M is secured to the top of the hub $K^3$ by screws M' and has an upwardly extending bifurcated lug $M^2$ pivotally connected by the pin L' with the lever L to form a fulcrum of the latter. Lock nuts N engaging a threaded upper end portion of the rod D form an adjustable shoulder against which the nose portion $L^2$ of the lever will bear to move the rod D upward. A spring O sleeved about a reduced shank portion of the rod D between a shoulder thereon and the cap M forms a means for resiliently moving the rod D downward to engage the clutch members $H^2$ and $I^3$.

With the construction as described, normally the resilient pressure of the spring O will hold the clutch members $H^2$ and $I^3$ in engagement thereby coupling the pulley H directly to the pulley I so that both will revolve at the same angular speed. If, however, the lever L is actuated to move the rod D upward this will disengage the clutch members $H^2$, $I^3$ and will engage the brake members G' and K'. The members G will then be locked against rotation so that the continued rotary movement of the pulley H will transmit motion through the gear wheel $J^3$, pinions $J^4$ and sun gear J to the pulley I driving the latter in a direction reverse from that of the pulley H and at a higher angular speed.

One use for my improved reversible transmission is illustrated in Fig. 4 in which the column C arising from a base C' has inserted in its upper end the lower end c' portion of the post A which is secured from rotation therein. A motor P is mounted at one end of a cross arm C² on the column C and a drill spindle P' is mounted at the opposite end of said cross arm. The motor P has a pulley P² connected by a belt P³ with the pulley H of the unit, while the pulley I of the unit is connected by a belt P⁴ with a pulley P⁵ on the spindle P'. Thus, the motor will normally drive the spindle P' in the proper direction for drilling or tapping but, when the lever L is depressed, the spindle P' will be driven in the reverse direction and at a higher speed.

To facilitate assembly of the parts, the sleeve member E is formed in two sections E² and E³ each carrying a race member for the ball bearing E'. The section E² is coupled to the rod D by the cross bar F and the section E³ is coupled to said rod through the cross bar F'. A screw Q engaging a threaded aperture in the inner end of the rod D bears against a cross bar F' and forms a means of adjustment of the race member of the section E³ relative to that of the section E².

All of the bearings for the working parts are enclosed within the structure and may be lubricated from a cup R mounted on the member K.

What I claim as my invention is:

1. A reversible transmission mechanism comprising a hollow post, adjacent drive and driven pulleys surounding said post provided with a direct clutch engagement with each other, said driven pulley being revolubly mounted directly upon said post to be axially immovable thereon, a head surrounding said post on which said drive pulley is revolubly mounted to be axially movable therewith, said head also having a brake element thereon, a sleeve surrounding and axially movable upon said post on which sleeve said head is revoluble to be axially movable therewith, a brake element fixed upon said post for cooperation with the brake element on said head to hold the latter from rotation, a planetary gear train enclosed by said pulleys in a space therebetween having the gears thereof respectively mounted on said pulleys and said head, and a member axially movable within said hollow post and connected through a slot therein with said sleeve, said member being adapted when moved in one direction to engage the clutch between said pulleys to directly couple the same and when moved in the opposite direction to engage the brake element on said head with the brake element fixed on said post thereby transmitting the rotary movement of said drive pulley through said planetary gear train into reverse rotary movement of the driven pulley.

2. A reversible transmission mechanism comprising a hollow post, adjacent drive and driven pulleys surrounding said post and having a cone clutch engagement with each other, said driven pulley being revolubly mounted directly upon said post to be axially immovable thereon, a head surrounding said post on which said drive pulley is revolubly mounted to be axially movable therewith, said head also having a cone brake element thereon, a sleeve surrounding and axially movable upon said post on which sleeve said head is revoluble to be axially movable therewith, a cone brake element fixed upon said post for cooperation with the cone brake element of said head to hold the latter from rotation, a planetary gear train enclosed by said pulleys and cone clutch elements including an internal gear wheel connected to said drive pulley, a sun gear connected to said driven pulley, planetary gears between said internal and sun gears, and journal bearings for said planetary gears connected to said head, a rod axially movable within said hollow post and connected through a slot therein with said sleeve, a resilient means for moving said rod in a direction to engage the clutch between said pulleys and a lever fulcrumed on said post for moving said rod in the opposite direction to engage the brake between said stationary brake element and head thereby causing the transmission of rotary movement of said drive pulley through said gears into reverse rotary movement of said driven pulley at a higher angular speed.

3. A reversible transmission mechanism comprising a hollow post, a rod extending axially within said post, a sleeve surrounding said post, a transverse bar extending through a slot in said post and connecting said rod to said sleeve, a head revolubly mounted on said sleeve to be axially movable therewith, said head having a cone brake element on a portion thereof, an inverted cup-shaped member fixed upon said post and having a cone brake element for engagement with the cone brake element on said head, a drive pulley revolubly mounted on another portion of said head to be axially movable therewith, said pulley having an internal cone clutch element, a driven pulley revolubly mounted directly on said post to be held against axial movement thereon, said driven pulley having an external cone clutch element for cooperating with the cone clutch element of said drive pulley, a planetary transmission enclosed by said pulleys and cone clutch elements including an internal gear wheel connected to said drive pulley, an external sun gear connected to said driven pulley and planetary gears mounted on journal bearings on said head, a helial spring sleeved upon a reduced diameter portion of said rod and bearing against a shoulder on the larger portion thereof, a cap mounted on the end of said post forming an abutment for the opposite end of said helical spring, and a lever fulcrumed on said cap and engaging a shoulder on said rod whereby said spring will normally hold said pulleys directly clutched to each other and the movement of said rod against the resistance of said spring will engage the brake member on said head with said member fixed upon said brake post to transmit rotary movement of said drive pulley through said gears into reverse rotary movement of said driven pulley at higher angular speed.

THEODORE E. GOHLKE.